Aug. 30, 1932.  A. E. CHURCH  1,874,082
CHUCK OR HOLDING DEVICE
Filed Feb. 28, 1931  2 Sheets-Sheet 1
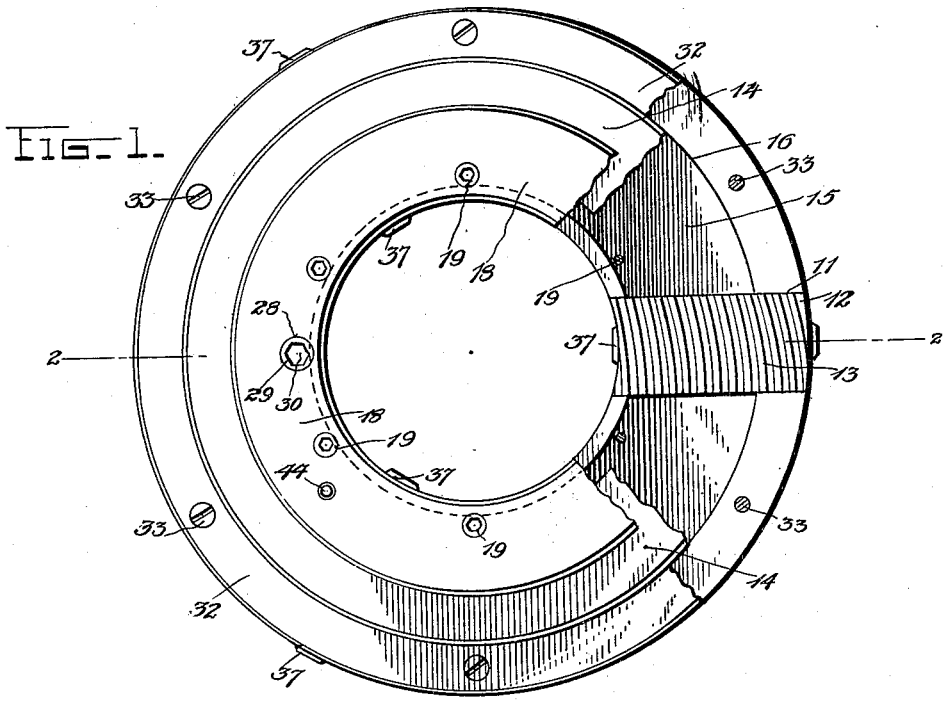
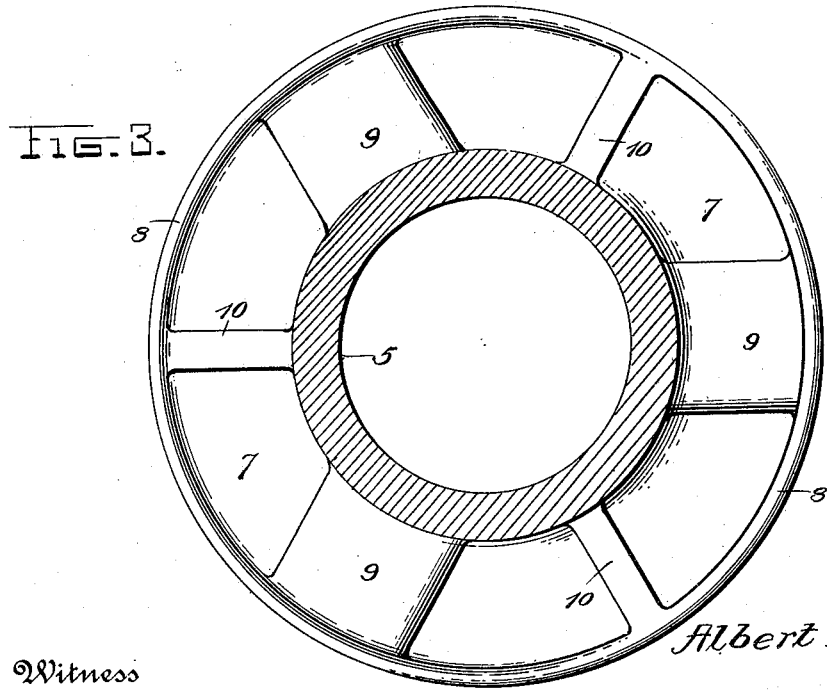
Inventor
Albert E. Church
By H. B. Wilson & Co.
Attorneys.
Witness
C. S. Hunt

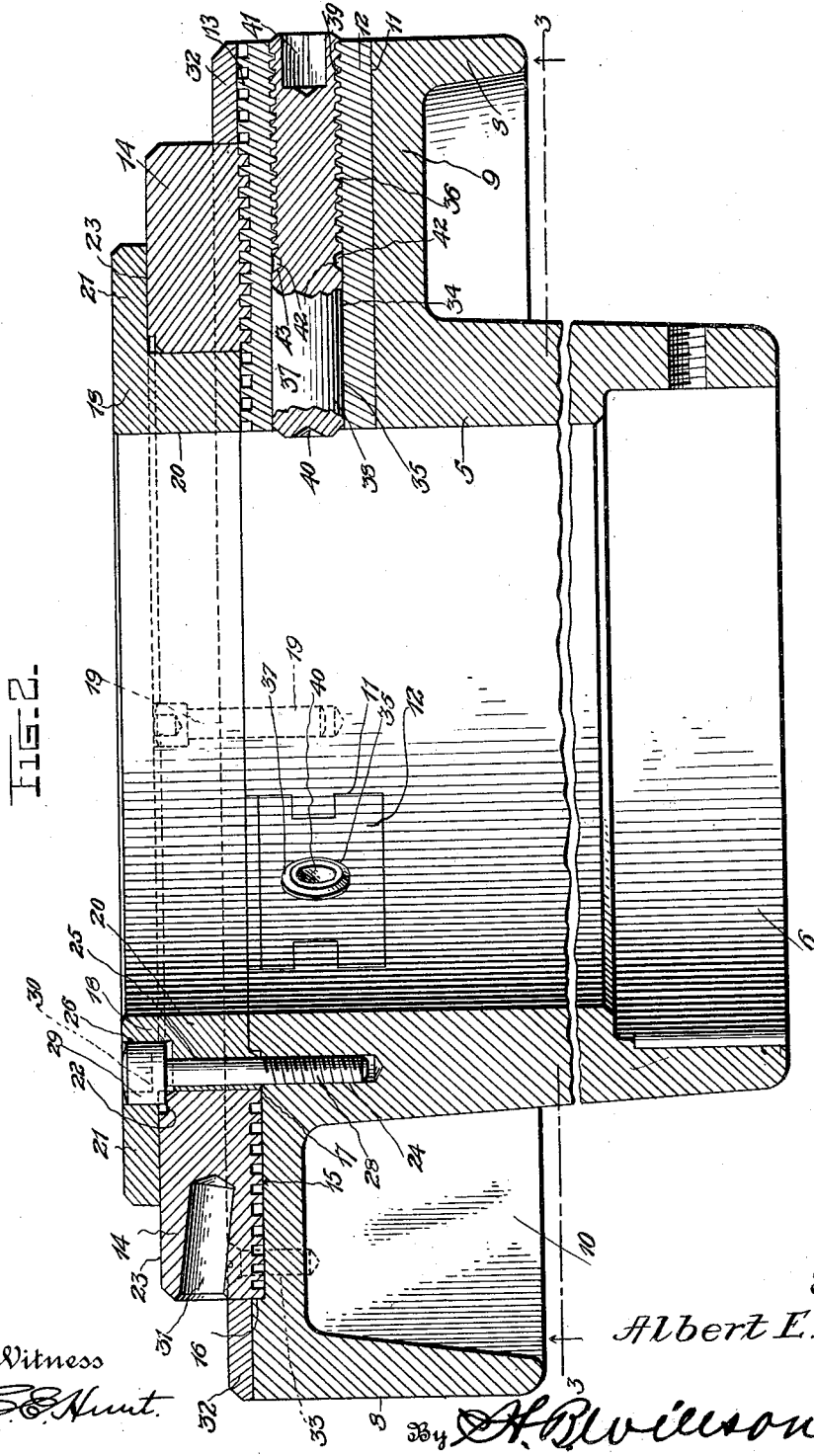

Patented Aug. 30, 1932

1,874,082

UNITED STATES PATENT OFFICE

ALBERT E. CHURCH, OF NEW BRITAIN, CONNECTICUT, ASSIGNOR TO THE UNION MANUFACTURING COMPANY, OF NEW BRITAIN, CONNECTICUT, A CORPORATION OF CONNECTICUT

CHUCK OR HOLDING DEVICE

Application filed February 28, 1931. Serial No. 519,217.

While the invention relates primarily to chucks and will be so described and claimed, the improved features of construction are equally applicable to other holding devices. Moreover, while the structure herein disclosed is a so-called tail-end chuck for use on the tail-end of a tubular spindle to co-act with a chuck on the other end of said spindle in driving rods, tubes and the like, the invention is not restricted to chucks of the tail-end variety.

The improved chuck herein illustrated is of the type in which the work-engaging jaws are simultaneously moved by a rotatable scroll, and one object of the invention is to provide simple, yet effective means for locking the scroll when the jaws are tightly engaged with the work, thereby preventing said scroll from creeping and allowing loosening of the jaws.

A further object of the invention is to provide the main chuck jaws with new and improved auxiliary jaws which may be extended beyond the work-engaging faces of said main jaws to grip small rods, tubes or other work, or may simply be used as additional clamping means for the work while the latter is held by said main jaws, in either instance making it possible to grip the work with several thousands pounds pressure.

A still further aim is the provision of a rather simple and light chuck which will possess high efficiency and many advantages.

With the foregoing in view, the invention resides in the novel subject matter hereinafter described and claimed, description being accomplished by reference to the accompanying drawings.

Fig. 1 is a face view of a chuck constructed in accordance with the invention.

Fig. 2 is a diametrical sectional view as indicated by line 2—2 of Fig. 1.

Fig. 3 is a transverse sectional view on line 3—3 of Fig. 2.

The construction herein disclosed, may be considered as preferred, and while this construction will be specifically described, it is to be understood that within the scope of the invention as claimed, variations may be made.

The numeral 5 on the drawings, denotes a tubular hub of any desired length, whose end 6 is adapted in any preferred way, for mounting upon a spindle. The other end of the hub 5 is provided with an integral continuous lateral flange 7 of uniform width throughout its circumference, and the peripheral edge of said flange 7 is provided with an integral, continuous rim flange 8 which surrounds and is spaced outwardly from the hub 5. Relatively wide radial ribs 9 and comparatively narrow radial ribs 10, extend between the hub 5 and the rim flange 8 and are integral with these parts, as well as being integral with the lateral flange 7. The two sets of ribs 9 and 10 are spaced apart equi-distantly with regard to the circumference of the chuck head and there are preferably three of each of said ribs 9 and 10, although other numbers could be employed if desired. The relatively wide ribs 9, the hub 5, the flange 7 and the flange 8, are jointly grooved to provide guideways 11 for main chuck jaws 12, said jaws having teeth 13 engaging an annular scroll 14. This scroll lies against the bottom 15 of a relatively wide and shallow groove 16 formed in the outer side of the lateral flange 7, said groove bottom 15 being flat. The groove 16 is of a width greater than that of the scroll 14 and the larger diameters of the two are preferably the same, so that the groove extends inwardly beyond the scroll as shown in Fig. 2. This inwardly extending portion of the groove 16 receives an annular extension 17 upon a scroll-retaining ring 18. This ring is secured to the chuck head by counter-sunk screws 19 and is of angular cross section, the angularly related portions of the ring being denoted at 20 and 21 respectively. The ring portion 20 is disposed slidably against the inner edge of the scroll 14 and is seated solidly against the outer side of the chuck head, while the ring portion 21 lies slidably against the outer side of said scroll 14. This scroll is formed with an annular shoulder 22 disposed in the vertex between the angularly related ring portions 20 and 21, said shoulder 22 being in a plane parallel with and inwardly spaced from the flat outer side 23 of said scroll 14. Hence, the shoulder 22 is positioned so that it can never come in contact with the ring portion 21, which is advisable because of the fact that said shoulder may become bruised in a manner hereinafter explained, and if it were permitted to contact with said ring portion 21 in a bruised condition, it would obviously interfere with smooth rotation of the scroll.

Near the inner edge of the scroll 14, the chuck head and the ring 18 are formed with alined openings 24 and 25 respectively. The outer end of the opening 25 is enlarged as denoted at 26 and exposes the shoulder 22, the distance from the outer face of the ring 21 to the inner end of the enlargement 26, being somewhat greater than the distance from said face to the shoulder 22. A scroll-clamping screw 28 is received in the openings 24 and 25 and is threaded into the former or into both if desired. The outer end of this screw is provided with an enlarged cylindrical head 29 received in the enlarged end 26 of the opening 25, said head overlapping the shoulder 22. Hence, upon tightening of the screw 28 after operating the scroll 14 to tightly engage the jaws 12 with the work, said scroll will be tightly clamped against the bottom 15 of the groove 16 and will consequently be locked against creeping, so that the jaws cannot loosen from this cause. To permit tightening and releasing of the screw 28, its head 29 is provided with a wrench-receiving socket 30, and to allow forcible rotation of the scroll 14, I have shown its periphery provided with a plurality of sockets 31, any of which may receive a handle bar (not shown).

Preferably used in connection with the features above described, is a second ring 32 which is secured upon the flange 7 by screws 33, said ring slidably abutting the peripheral edge of the scroll 14.

When the screw 28 is loosened sufficiently to relieve forcible contact of its head 29 with the shoulder 22, the scroll 14 may be readily moved in either direction to operate the jaws. Whenever these jaws have been brought into tight clamping relation with the work, the scroll 14 may be locked by tightening the screw 28, regardless of the extent to which said scroll has been turned. Tightening of the screw causes its head 29 to tightly engage the shoulder 22, thus drawing the scroll 14 tightly against the chuck head. Obviously, the co-acting faces of the shoulder 22 and the head 29 will in time become marred or bruised, causing more or less roughening of the shoulder 22, but this will not interfere with smooth turning of the scroll 14, due to the fact that said shoulder 22 is inwardly spaced from the ring portion 21, instead of contacting with the latter.

Each jaw 12 is provided with a longitudinal cylindrical bore 34 having a plain inner end portion 35 and a threaded outer end portion 36. Auxiliary jaws 37, of cylindrical form, are received in the bores 34. Each auxiliary jaw 37 is provided with a plain inner portion 38 received in the plain portion 35 of the bore 34, and the outer end portion of each of said auxiliary jaws 37, is provided with a screw thread 39 engaging the thread 36. The inner end of each jaw 37 is shaped at 40 for tight engagement with the work, and the outer end of each of said jaws is provided with a socket 41 to engage a wrench or the like.

When the jaws 12 are engaging the work, the auxiliary jaws 37 may be used merely to obtain a greater work-clamping force. By rotating these jaws 37 with a wrench or the like, they may be threaded inwardly into such tight engagement with the work as to produce several thousands pounds pressure. When unusually small work is to be engaged, the auxiliary jaws 37 may be extended inwardly beyond the main jaws 12, allowing work-gripping without inwardly moving said jaws 12 an excessive amount out of their guideways 11. When the jaws 37 are used in either of the ways described, due to their location centrally of the jaws 12, they exact no cramping strain upon said jaws 12. Furthermore rigid relation between them and the main jaws 12 will be maintained, due to the snug contact of the plain cylindrical portions 38 of said jaws 37, with the plain cylindrical wall portions 35 of the bores 34. Such rigid relation could not be maintained if the jaws 37 and the bores 34 were threaded throughout their lengths. Moreover, such extended threading would weaken the jaws 37 to such an extent as to allow springing and chattering thereof, when extended appreciably beyond the main jaws 12 and would allow the screw thread to become loaded with small chips and dust from the cutting tools. Furthermore, if each jaw 37 were threaded throughout its length, there would be danger of breakage whenever said jaw was extended inwardly beyond the main jaw 12, for the portion of the valley of the screw thread at the inner extremity of said jaw 12, would constitute an initial line of fracture at which the strains set up by work-driving would be localized, with severe danger of breakage at this point. The plain jaw portion 38 however, is free from any such initial line of fracture, and hence work-driving strains are less liable to fracture the jaw 37.

Each jaw 37 is preferably provided with a peripheral groove 42 at the juncture of its threaded and plain portions 39 and 38 respectively. This groove receives the threading tool at the end of each cut, when forming the screw threads 39 and said groove also performs other functions. The side wall 43 of the groove toward the end 40 of the jaw 37, forms a stop to abut the screw thread 36 to limit withdrawal of the jaw 37 into the bore 34. Hence, there is no danger of the auxiliary jaws 37 accidently creeping out of the bores 34, while the chuck is being driven. The groove 42 may also serve to receive a heavy lubricant, serving to lubricate all contacting faces of the main and auxiliary jaws and hence allowing easy relative movement thereof. To facilitate rotating of the scroll, a suitable oiler 44 is preferably employed.

It will be seen from the foregoing that a chuck has been provided of novel and advantageous construction, and while the details disclosed may be considered as preferred, as above stated, attention is again invited to the fact that within the scope of the invention as claimed, variations may be made.

I claim:—

1. In a chuck having a head and a jaw-adjusting scroll mounted on and having its inner side lying against said head; a headed screw extending transversely of one circular edge of said scroll, said screw being extended inwardly beyond the inner side of said scroll and threaded into the chuck head, and having its head overlapped with the outer side of said scroll, whereby upon tightening of said screw, said scroll will be tightly clamped between said screw head and the chuck head.

2. A chuck comprising a head having radial guideways, jaws slidable in said guideways, a scroll engaging said jaws, a ring of angular cross section secured to said head and having its angularly related portions disposed slidably against one circular edge and the outer side of said scroll respectively, said ring and body having alined openings parallel with the axis of the head, the opening of said ring having an enlarged outer end exposing a portion of the outer side of said scroll, and a scroll-locking screw received in said alined openings, said screw having a head within said enlarged end of the opening of said ring, said head overlapping said exposed portion of said scroll and being adapted upon tightening of said screw to lock said scroll.

3. A chuck comprising a head having radial guideways, jaws slidable in said guideways, a scroll engaging said jaws, a ring of angular cross section secured to said head and having its angularly related portions disposed slidably against one circular edge and the outer side of said scroll respectively, said scroll having an annular shoulder within the vertex formed between said angularly related ring portions and spaced inwardly from said outer side of said scroll, said ring and body being provided with alined openings near said circular edge of said scroll, the opening through said ring having an enlarged outer end exposing said shoulder and extending inwardly beyond the latter, and a scroll-locking screw received in said openings and having a head within said enlarged end of the opening of said ring, said head overlapping said shoulder of the scroll and being adapted upon tightening of said screw to clamp said scroll against said head.

4. A chuck comprising a tubular hub having an integral lateral flange at one end, the peripheral edge of said lateral flange being provided with an integral continuous rim flange surrounding and spaced from said hub, wide radial ribs integral with said hub, said rim flange and said lateral flange; said ribs, said hub, said lateral flange, and said rim flange being jointly grooved to provide jaw guideways which open through the inner and outer peripheries of said hub and rim flange respectively and through the front of said lateral flange but not through the rear side of said ribs, jaws slidable in said guideways, a scroll engaging said jaws, and means mounting said scroll at the front side of said lateral flange and upon said lateral flange.

5. A chuck jaw having a cylindrical bore extending from its work-engaging face to its opposite end, the end portion of the bore wall toward said work-engaging jaw end being plain, the other end portion of said bore wall being threaded, and a cylindrical auxiliary jaw in said bore of a length adapting its inner end for projection beyond said work-engaging face of the first named jaw when required, said auxiliary jaw having a plain inner end portion snugly received in the plain end portion of said bore and a threaded outer end portion engaged with the threaded end portion of said bore, one end of said auxiliary jaw being shaped to anti-slippingly engage the work, the other end of said auxiliary jaw having wrench-engaging means, said auxiliary jaw being provided with an annular shoulder at the inner end of its plain end portion adapted to strike the thread of said bore to limit retraction of said auxiliary jaw into said bore.

6. A chuck jaw having a cylindrical bore extending from its work-engaging face to its opposite end, the end portion of the bore wall toward said work-engaging jaw end being plain, the other end portion of said bore wall being threaded, and a cylindrical auxiliary jaw in said bore of a length adapting its inner end for projection beyond said work-engaging face of the first named jaw when required, said auxiliary jaw having a plain inner end portion snugly received in the plain end portion of said bore and a threaded outer end portion engaged with the threaded end portion of said bore, one end of said auxiliary jaw being shaped to anti-slippingly engage the work, the other end of said auxiliary jaw having wrench-engaging means, said auxiliary jaw being provided with a peripheral groove at the juncture of its plain and threaded portions, said groove being adapted to retain grease to lubricate the contracting portions of the two jaws, the wall of said groove toward the plain end portion of the auxiliary jaw being adapted to strike the thread of said bore to limit retraction of said auxiliary jaw into said bore.

In testimony whereof I affix my signature.

ALBERT E. CHURCH.